(12) United States Patent
Thai et al.

(10) Patent No.: US 9,726,509 B1
(45) Date of Patent: Aug. 8, 2017

(54) PROFILE AWARE NAVIGATION (71) Applicant: INTERNATIONAL BUSINESS MACHINES CORPORATION, Armonk, NY (US)

(72) Inventors: Franck L. Thai, White Plains, NY (US); Ramya Raghavendra, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/279,833

(22) Filed: Sep. 29, 2016

(51) Int. Cl.
*G01C 21/34* (2006.01)
*G01C 21/36* (2006.01)

(52) U.S. Cl.
CPC ..... *G01C 21/3461* (2013.01); *G01C 21/3484* (2013.01); *G01C 21/3691* (2013.01)

(58) Field of Classification Search
CPC ............ G01C 21/3461; G01C 21/3484; G01C 21/3691
See application file for complete search history.

(56) References Cited

U.S. PATENT DOCUMENTS

| | | | | |
|---|---|---|---|---|
| 4,779,702 A | * | 10/1988 | Filsinger | B60T 8/171 180/197 |
| 7,902,969 B2 | * | 3/2011 | Obradovich | G01C 21/3484 340/439 |
| 8,306,740 B2 | * | 11/2012 | Muramatsu | G01C 21/3697 340/905 |
| 2002/0128773 A1 | * | 9/2002 | Chowanic | G01C 21/3484 701/414 |
| 2007/0138347 A1 | * | 6/2007 | Ehlers | G01C 21/3461 246/1 R |
| 2008/0033644 A1 | * | 2/2008 | Bannon | G01C 21/3461 701/414 |
| 2008/0133120 A1 | | 6/2008 | Romanick | |
| 2010/0057342 A1 | * | 3/2010 | Muramatsu | G01C 21/3697 701/533 |
| 2010/0094496 A1 | * | 4/2010 | Hershkovitz | G01C 21/3676 701/22 |
| 2010/0205060 A1 | * | 8/2010 | Athsani | G01C 21/3484 701/532 |

(Continued)

FOREIGN PATENT DOCUMENTS

DE 102008033297 A1 2/2009

*Primary Examiner* — Dale W Hilgendorf
(74) *Attorney, Agent, or Firm* — Cantor Colburn LLP; David Quinn (57) ABSTRACT

Embodiments include computer-implemented method, systems and computer program products for route planning utilizing a Global Positioning System (GPS) device to determine an accessible route of a person travelling in a vehicle. The computer-implemented method includes generating, by at least one processor of the GPS device utilizing a map database, a route and retrieving a vehicle profile identifying operable conditions of the vehicle. Information from a route condition database relating to conditions along the route is retrieved and it is determined based upon the conditions along the route and the operable conditions of the vehicle if the route is an authorized, passable route for the vehicle. In response to determining if the route is an authorized, passable route for the vehicle, the route is presented on a display screen.

16 Claims, 4 Drawing Sheets (56) References Cited

U.S. PATENT DOCUMENTS

2011/0087429 A1     4/2011   Trum
2011/0238457 A1*   9/2011   Mason ............... G01C 21/3484
                                                                                                  340/441

\* cited by examiner

PROFILE AWARE NAVIGATION

BACKGROUND

The present invention relates generally to vehicle navigation systems, and more specifically to methods, systems and computer program products for route planning that takes into account profile information related to the vehicle.

Vehicle navigation systems, also known as global positioning systems (GPS), are used to find direction in an automobile. A GPS includes a satellite navigation device that obtains position data, which is then correlated to a position on a road. When directions are needed, routing can be calculated. On the fly traffic information can be used to adjust the route. Dead reckoning using distance data from sensors attached to the drivetrain, a gyroscope and an accelerometer can be used for greater reliability because GPS signal loss and/or multipath can occur due to urban canyons or tunnels.

SUMMARY

In accordance with an embodiment, a computer-implement method for route planning utilizing a Global Positioning System (GPS) device to determine an accessible route of a person travelling in a vehicle is provided. The computer-implemented method includes generating, by at least one processor of the GPS device utilizing a map database, a route and retrieving a vehicle profile identifying operable conditions of the vehicle. Information from a route condition database relating to conditions along the route is retrieved and it is determined based upon the conditions along the route and the operable conditions of the vehicle if the route is an authorized, passable route for the vehicle. In response to determining if the route is an authorized, passable route for the vehicle, the route is presented on a display screen.

In accordance with another embodiment, a system for route planning utilizing a Global Positioning System (GPS) device to provide for an accessible route of a person travelling in a vehicle is provided. The system includes a processor configured to receive an origin and destination for a first vehicle and retrieve a vehicle profile identifying operable conditions of the first vehicle. A plurality of available routes from the origin to the destination is generated using a map database and the processor retrieves information from a route condition database relating to conditions along the routes. Based upon the conditions along the routes and the operable conditions of the vehicle, authorized, passable routes by the first vehicle are determined and one optimal route is presented on a display screen.

In accordance with a further embodiment, a computer program product for route planning utilizing a Global Positioning System (GPS) device to provide an accessible route of a person travelling in a vehicle is provided. The computer program product includes a non-transitory storage medium readable by a processing circuit and storing instructions for execution by the processing circuit for performing a method. The method includes receiving an origin and destination for a first vehicle and retrieving a vehicle profile identifying operable conditions of the first vehicle. A plurality of available routes from the origin to the destination is generated using a map database and the processor retrieves information from a route condition database relating to conditions along the routes. Based upon the conditions along the routes and the operable conditions of the vehicle, authorized, passable routes by the first vehicle are determined and one optimal route is presented on a display screen.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

One or more embodiments of the present invention present a profile aware navigation system which utilizes a profile of the vehicle for providing route recommendations for the vehicle. Embodiments of the invention allow for a system to utilize vehicle specific information which may relate to circumstances existing along a particular route which is utilized by a navigation system for recommending a route which is suitable for being traversed by the transport.

In particular, embodiments of the invention are directed to providing routes by a navigation system which includes information relating to the operational characteristics of a vehicle or the physical and mental state of a driver for considering routes which are conducive to the operational characteristics. Traditional route planning merely utilizes information relating to a series of possible routes including traffic, accidents, and highway repair. However, due to other conditions, such as route conditions due to weather, snow, ice, flooding, such conditions may impact the utilization of a particular type of vehicle such as a small compact car, or an automobile lacking four or all-wheel drive and such routes are inadvisable as they may not be traversable by the vehicle in question. According to embodiments of the present invention, a vehicle profile is created identifying the particular operational parameters of the vehicle. This profile is referenced when the navigational system recommends a particular route. Other conditions which may exist are vehicle restrictions such as the prohibition of recreational vehicles or commercial vehicles on certain roadways designated for passenger vehicles only.

Figure 1:
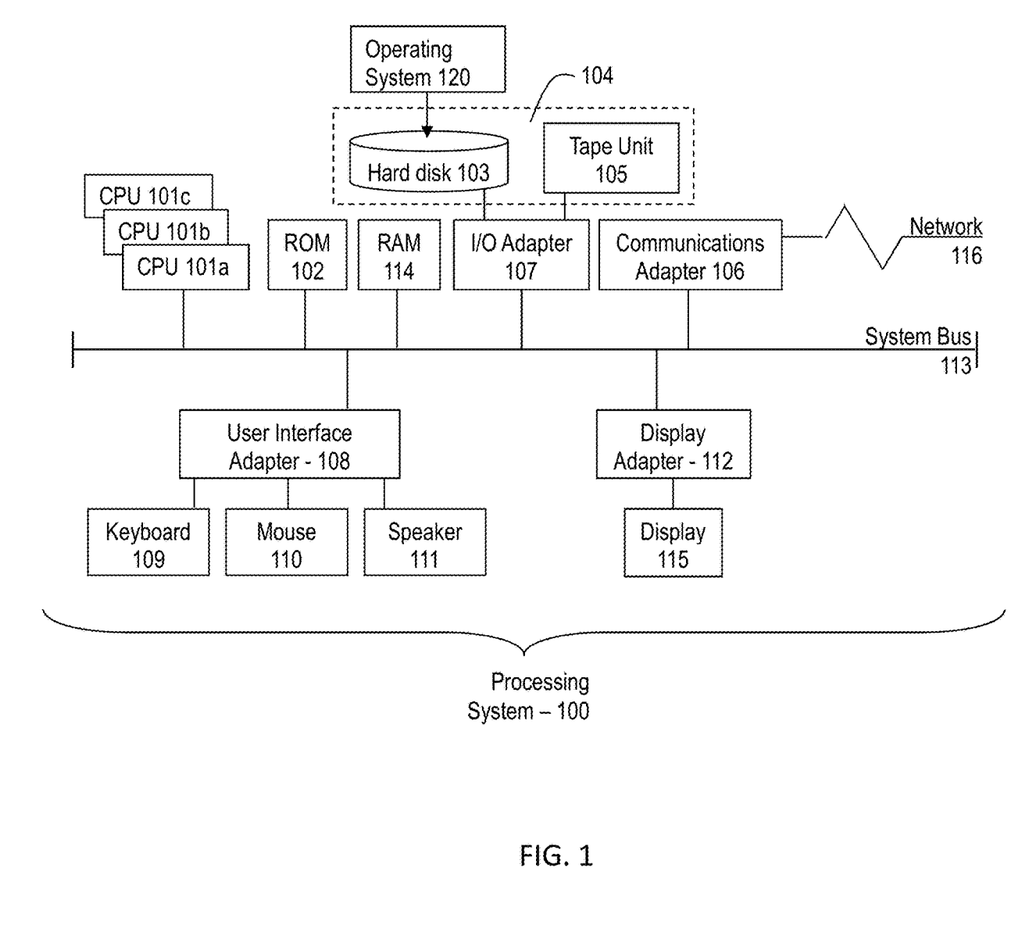
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101*a*, 101*b*, 101*c*, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
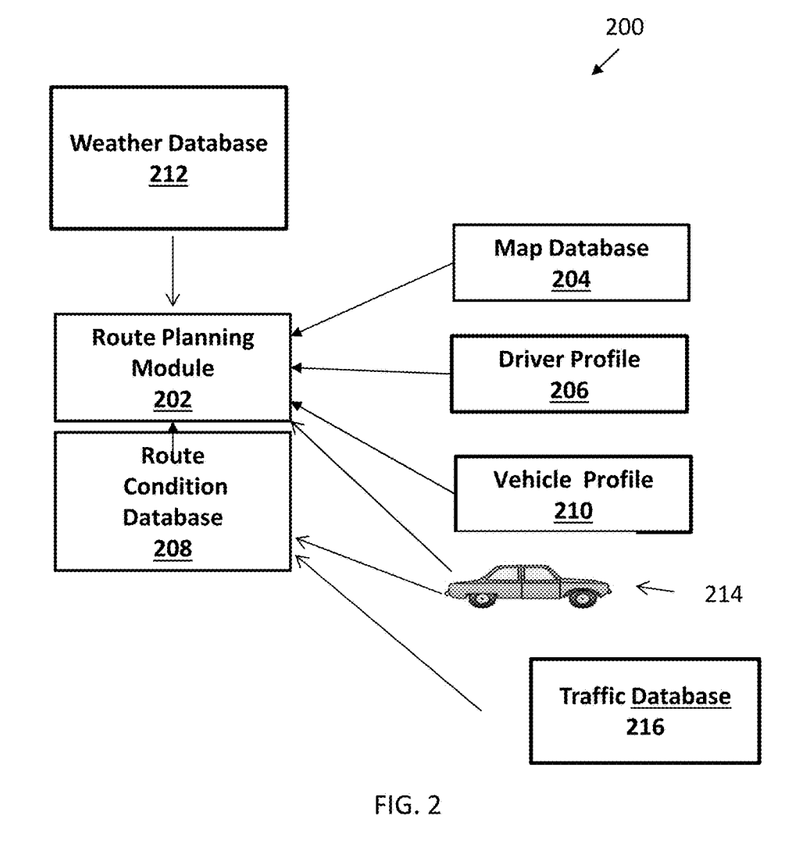
FIG. 2 is a block diagram illustrating a system for route planning utilizing information relating to the route and profile information relating to the vehicle and the driver in accordance with some embodiments.

Referring now to FIG. 2, a system 200 for route planning utilizing profile information relating to the vehicle in accordance with embodiments is shown. In some embodiments, the system 200 may be embodied on a computing system similar to the one shown in FIG. 1. The system 200 includes a route planning module 202, which can be implemented as a component of a global positioning system (GPS) having a display screen. The route planning module 202 is configured to receive data from a route condition database 208, a map database 204, an individual profile 206, a vehicle profile 210 and a weather database 212. In some embodiments, the route planning module 202 uses the information from the map database 204 to calculate multiple routes from the origin to the destination. In some embodiments, the map database 204 may be configured to receive the origin and destination from the route planning module 202 and to return multiple routes from the origin to the destination to the route planning module 202. In some embodiments, each of the multiple routes from the origin to the destination includes an indication of the expected travel time. The indication of the expected travel time can be a distance of the route, a mean travel time on the route, a median travel time on the route, or the like.

In some embodiments, the route planning module 202 queries the route condition database 208 based on the information associated with each of the available routes from the origin to the destination. The route planning module 202 receives route condition information from the route condition database 208. The route condition information may include information relating to the road surfaces. The road surfaces may be slippery due to recent rain, or impassible due to the accumulation of snow. Route planning module 202 also receives weather information provided by weather database 212. Weather conditions along the entire route may be assessed from the origination point to the destination point. If the weather conditions along a route may change during the duration of the route, a particular route may be suggested from the onset of the trip if such adverse conditions would arise along an alternative route making such route undesirable.

Also, the route condition information may relate to the types of vehicles permitted to utilize the road. For instance certain roads prohibit the passage of commercial vehicles or vehicles over a certain tonnage. Also, certain roads, for instance roads which utilize tunnels, do not allow for the passage of vehicles transporting bottled gas such as a camper. Additionally, the route condition information may include input received from vehicles 214 previously passing along a predetermined route regarding the conditions of the road. Information received from vehicles 214 may be provided to the route planning module or the route condition database. For instance, if a type of vehicle such as a compact car turned around from a particular point in the road and a type of vehicle such as a four wheel drive passed along the road, it may be assumed that the road has a certain condition, such as a temporary flooding or road blockage due to a tree down or mudslide, which is impassable for a vehicle lacking four wheel drive or other feature. Additionally, this situation may also arise from very slippery conditions due to ice accumulation and certain vehicles lacking tire chains or other features such as all-wheel drive would turn around finding the route impassable.

In some embodiments, a vehicle profile 210 is provided to the route planning module 202 to assist in determining an appropriate route for the vehicle. The vehicle profile 210 contains information specific to the vehicle. The profile may consist of information previously requested by the route planning module 202 and manually provided by an end user. Additionally, an application may be installed on a smartphone requesting information from a user relating to the attributes of the vehicle. An end user may input answers to the requested questions and the information would be uploaded to the route planning module 202. The route planning module 202 may be located either on the smartphone or other computing device. The vehicle profile may include information relating to the type of vehicle e.g. sedan, sports utility, pick-up, recreational vehicle, motorcycle, compact car. The vehicle profile may also contain information relating to the vehicle's drive train e.g. two wheel drive, four wheel drive, rear wheel drive, automatic shifting or standard shifting. The vehicle profile may also contain information relating to the current mechanical status of the vehicle, e.g. tire pressure, number of headlights or taillights functioning, wind shield wipers efficiency, braking system condition, snow chains, snow tires, or all-weather tires. In an alternative embodiment, an application running on a smartphone may interact with the on-board diagnostic II port of the vehicle. Access to the on-board diagnostic II port enables information relating to the vehicle subsystems such as the electrical system, fuel system, fuel efficiency, to be provided as well as the make and model of the vehicle. Additional information relating to the vehicle operation may be provided via the on-board diagnostic II port as sensors are integrated into the vehicle's systems.

In some embodiments, a driver profile may also be provided. The driver profile may include the age of the driver as senior drivers may have slower reflexes. For instance an older driver may prefer to have a straight, well light route due to better visibility and less maneuvering of the vehicle being required. Additionally, the health of the driver may be provided. For instance the driver may have trouble seeing in darker conditions which would result from a storm. In addition to the driver's age or health, personal experience of the driver may be provided or the driver's likes and dislikes of a route. For instance, a driver may be new and inexperienced in a certain area such as a large city like New York or the driver may be experienced having visited and driven through New York several times. Also the driver may have driving preferences such as scenic routes along rivers.

Figure 3:
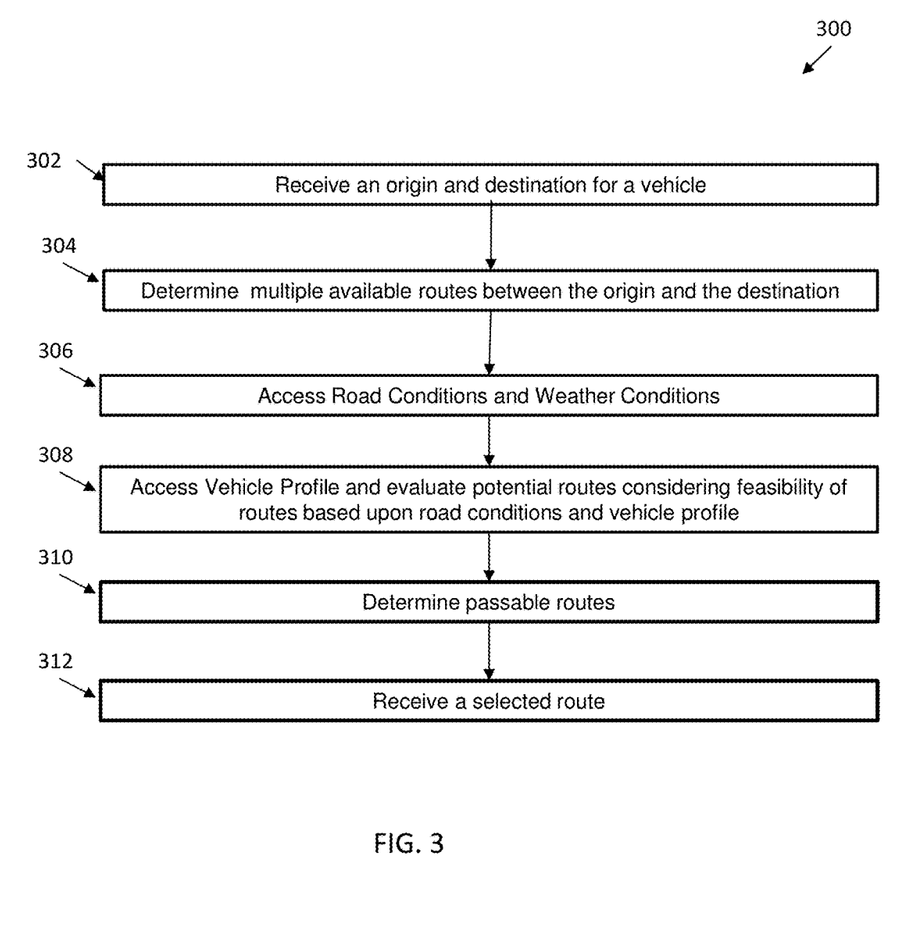
FIG. 3 is a flow diagram of a method for route planning utilizing information relating to the route and profile information relating to the vehicle in accordance with some embodiments.

Referring now to FIG. 3, a flow diagram of a method 300 for route planning utilizing a Global Positioning System (GPS) to provide for an accessible route of a person travelling in a vehicle in accordance with some embodiment is shown. As shown at block 302, the method 300 includes receiving an origin and destination for a vehicle from a user utilizing the GPS device. Next, as shown at block 304, the method 300 includes determining multiple available routes between the origin and the destination. The method 300 also includes accessing the route conditions and weather conditions as shown at block 306. In some embodiments, accessing route and weather conditions creates an initial dataset for determining if a route is available for a particular vehicle. The route conditions may be provided by a route condition database which contains information relating to which vehicles are authorized to pass on the particular route. For instance, certain routes may prohibit the passage of a commercial vehicle or a vehicle carrying bottled gas. Also, the route conditions may be provided by other vehicles traversing the route. For instance, if a particular vehicle is on a particular route and turns around, it may be determined that the route is impassable for that type of vehicle if several vehicles of the same type also turn around at the same location. Also the weather condition along the route may be provided by a weather database and provide real-time updates which may affect the pass ability of a particular route. Additionally, traffic information may be provided which indicates the pass ability of a particular route. Next, as shown at block 308, the method 300 includes accessing the vehicle profile which contains attributes of the vehicle. These attributes include the make and model of the vehicle, the status of the vehicle's components such as the air pressure in the tires, the type of tires utilized such as snow tires or all purpose, which lights are functioning, the drive train of the vehicle, or if the vehicle is using snow chains. With the vehicle profile information, potential routes are evaluated considering the feasibility of the routes being passable based upon route conditions and vehicle profile. At block 310, those routes which are passable and which authorize passage of the vehicle based on the vehicle profile are determined. At block 312 a selected route based on the route condition and vehicle profile is presented to the display of the GPS device. The route is updated in real time as route condition information is continuously monitored by the route planning module and the determination of passable routes is continuously being determined. In the event an original suggested route becomes impassable, an updated route is provided to the driver.

Figure 4:
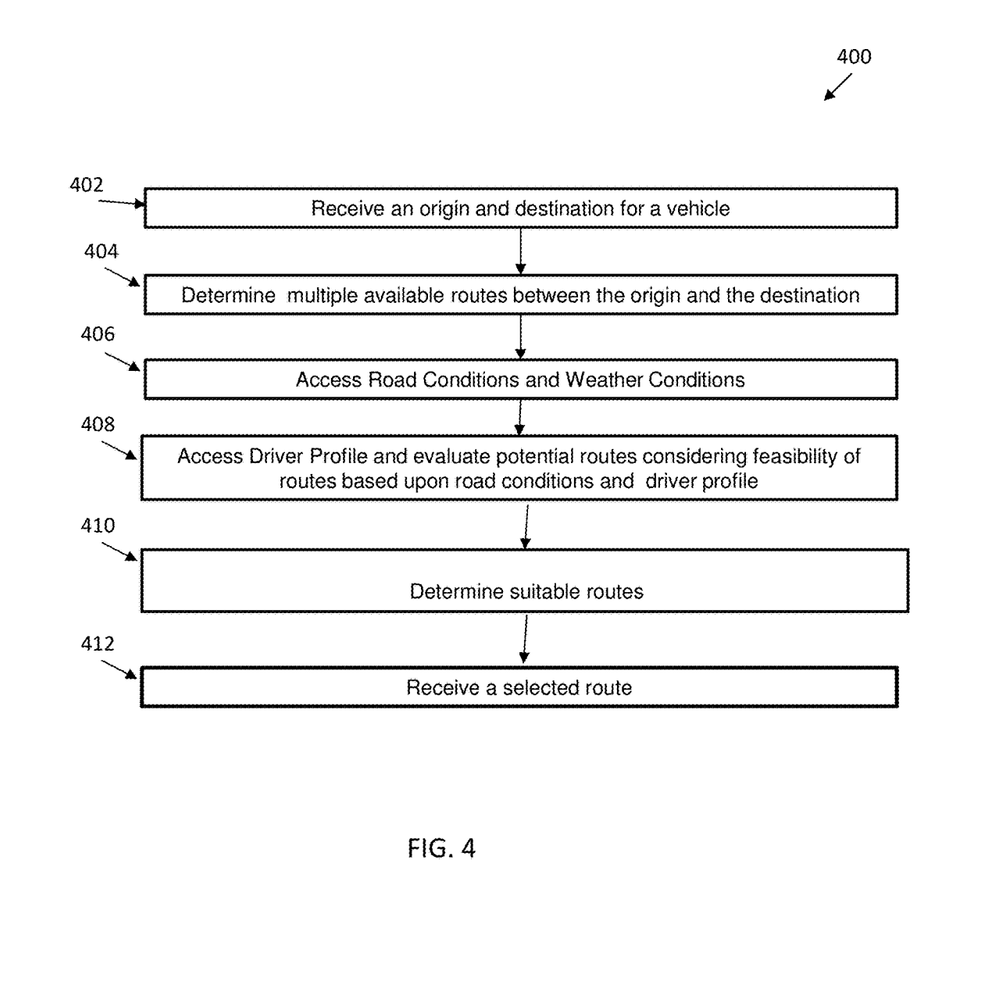
FIG. 4 is a flow diagram of another method for route planning utilizing information relating to the route and profile information relating to the driver of a vehicle in accordance with some embodiments.

Referring now to FIG. 4, a flow diagram of a method 400 for route planning utilizing a Global Positioning System (GPS) to provide for an accessible route of a person travelling in a vehicle in accordance with some embodiments is shown. As shown at block 402, the method 400 includes receiving an origin and destination for a vehicle from a user utilizing the GPS device. Next, as shown at block 404, the method 400 includes determining multiple available routes between the origin and the destination. The method 400 also includes accessing the route conditions and weather conditions as shown at block 406. In some embodiments, accessing route and weather conditions creates an initial dataset for determining if a route is available for a particular vehicle. Next, as shown at block 408, the method 400 includes accessing the driver profile which contains attributes of the driver. These attributes include the age of the driver, driving experience of the driver, physical limitations such as eye sight, hearing or reflex speed and if the driver is experienced in an area. These attributes may influence which routes are suitable for the driver. For instance if a route has a lot of traffic, the route may be considered unsuitable for an inexperienced driver, or one with physical limitations such as poor eyesight. Also, a traffic database may identify that the traffic along a particular route is experiencing a high average speed which may be too fast for an elderly driver with poor reflexes or inexperienced driver. Also, if an individual is inexperienced, road surfaces which are slippery with accumulation of moisture or snow may be considered not suitable by the driver. Also, the driver may have preferences of particular routes that border rivers or scenic routes versus a highway. With the driver profile information, potential routes are evaluated considering the feasibility of the routes being suitable based upon route conditions and driver profile. At block 410, those routes which are suitable and which authorize passage of the vehicle based on the vehicle profile are determined. At block 412 a selected route based on the route condition and vehicle profile is presented to the display of the GPS device.

In this illustrative example, the advantage of the embodiment as shown enables a method for route planning utilizing a Global Positioning System (GPS) device to provide for an accessible route of a person travelling in a vehicle. The method allows for an intelligent decision of determining which routes are not only available for a vehicle, but also suitable for passage by the vehicle by considering a route selection based on the characteristics of the vehicle. Typically navigational systems merely provide routes from map databases. The present invention utilizes information particular to a vehicle in view of current route conditions which provide for selecting only those routes which are suitable and passable by the vehicle. For instance, a route may be partially blocked by a mudslide or high water. Depending on if a vehicle was a four by four SUV or a small compact car; the route may be navigable or passable by the SUV but not the compact car. Providing the specific vehicle information allows for an accurate passable route to be provided to the GPS system. Additionally, other attributes may impact if a route is passable by a vehicle, such as if the vehicle is of the type authorized to utilize the route or if the vehicle has snow tires for snowy conditions. Furthermore, in some embodiments, a driver profile is provided to assist in determining routes suitable for passage. For instance, a driver may be inexperienced and a less traffic route may be better suited for the driver than a heavily congested route. By providing information specific to the transport in determining the route selection, a better route is presented to the driver of the vehicle than customarily done by just submitting routes obtained from a map directory.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for route planning utilizing a Global Positioning System (GPS) device to provide for an accessible route of a person travelling in a vehicle, the method comprising:
  generating, by at least one processor of the GPS device utilizing a map database, a route;
  retrieving, by the at least one processor, a vehicle profile identifying operable conditions of a first vehicle, wherein the operable conditions of the first vehicle include at least if the first vehicle has snow chains on the tires of the first vehicle;

retrieving, by the at least one processor, information from a route condition database relating to conditions along the route, wherein the conditions along the route include at least one of the following: if a road has an accumulation of snow or ice; and if transportation of bottled gas is unauthorized;

providing a driver profile for a driver, the driver profile including an age of the driver, physical limitations of the driver, route preferences of the driver, and driving experience of the driver;

determining, by the at least one processor, based upon the conditions along the route, the operable conditions of the first vehicle, and the driver profile, if the route is an authorized, passable route for the first vehicle;

in response to determining if the route is the authorized, passable route for the first vehicle, presenting the route on a display screen; and receiving information from a second vehicle regarding the conditions of the route and determining if the operable conditions of the first vehicle enable the first vehicle to pass along the route.

2. The computer-implemented method of claim 1, wherein the operable conditions of the first vehicle include at least one of the following: a type of vehicle, drive train of the first vehicle, and an authorized route permits the first vehicle having the operable condition to traverse the route.

3. The computer-implemented method of claim 2, wherein the operable conditions of the vehicle are provided by vehicle sensors.

4. The computer-implemented method of claim 1, wherein the conditions along the route include at least one of the following: a type of vehicle authorized for utilizing the road; if the road is partially flooded.

5. The computer-implemented method of claim 1, further including a weather database providing weather conditions from an origin of the route to a destination of the route, the conditions of the route including the weather conditions.

6. The computer-implemented method of claim 1, further including defining the route as being unpassable if information received from the second vehicle of a type similar to the first vehicle identifies that the route was not passable by the second vehicle.

7. A computer program product for route planning utilizing a Global Positioning System (GPS) device to provide an accessible route of a person travelling in a vehicle, the computer program product comprising:

a computer readable storage medium readable by a processing circuit and storing instructions for execution by the processing circuit for performing a method comprising:

receiving an origin and destination, by at least one processor of the GPS device, for a first vehicle;

retrieving, by the at least one processor, a vehicle profile identifying operable conditions of the first vehicle, wherein the operable conditions of the first vehicle include at least if the first vehicle has snow chains on the tires of the first vehicle;

generating, by the at least one processor, from a map database a plurality of available routes from the origin to the destination;

retrieving, by the at least one processor, information from a route condition database relating to conditions along the plurality of routes, wherein the conditions along the route include at least one of the following: if a road has an accumulation of snow or ice; and if transportation of bottled gas is unauthorized;

providing a driver profile for a driver, the driver profile including an age of the driver, physical limitations of the driver, route preferences of the driver, and driving experience of the driver;

determining, by the at least one processor, based upon the conditions along the plurality of routes, the operable conditions of the first vehicle, and the driver profile, authorized, passable routes by the first vehicle;

in response to determining authorized passable routes by the first vehicle, presenting one optimal route on a display screen; and receiving information from a second vehicle regarding the conditions of the route and determining if the operable conditions of the first vehicle enable the first vehicle to pass along the route.

8. The computer program product of claim 7, wherein the operable conditions of the first vehicle include at least one of the following: a type of vehicle, drive train of the vehicle, and an authorized route permits the first vehicle having the operable condition to traverse the route.

9. The computer program product of claim 7, wherein the conditions along the route include at least one of the following: type of vehicle authorized for utilizing the road; and if the road is partially flooded.

10. The computer program product of claim 7, further including a weather database providing weather conditions from the origin of the route to the destination of the route, the conditions of the route including the weather conditions.

11. The computer program product of claim 7, further including defining the route as being unpassable if information received from the second vehicle of a type similar to the first vehicle identifies that the route was not passable by the second vehicle.

12. A system for route planning utilizing a Global Positioning System (GPS) device to provide for an accessible route of a person travelling in a vehicle, the system comprising:

a processor configured to:

receive an origin and destination for a first vehicle;

retrieve a vehicle profile identifying operable conditions of the first vehicle, wherein the operable conditions of the first vehicle include at least if the first vehicle has snow chains on the tires of the first vehicle;

generate from a map database a plurality of available routes from the origin to the destination;

retrieve information from a route condition database relating to conditions along the plurality of routes, wherein the conditions along the route include at least one of the following: if a road has an accumulation of snow or ice; and if transportation of bottled gas is unauthorized;

providing a driver profile for a driver, the driver profile including an age of the driver, physical limitations of the driver, route preferences of the driver, and driving experience of the driver determining based upon the conditions along the route, the operable conditions of the first vehicle, and the driver profile, authorized, passable routes by the first vehicle;

in response to determining authorized, passable routes by the first vehicle, presenting one optimal route on a display screen; and receiving information from a second vehicle regarding the conditions of the route and determining if the operable conditions of the first vehicle enable the first vehicle to pass along the route.

13. The system of claim 12, wherein the processor is further configured to receive a selected route from the one or more of the plurality of available routes and providing real-time route guidance along the selected route.

14. The system of claim 13, wherein the conditions along the route include at least one of the following: type of vehicle authorized for utilizing the road; and if the road is partially flooded.

15. The system of claim 12, wherein the system includes a weather database providing weather conditions from the origin of the route to the destination of the route, the conditions of the route including the weather conditions.

16. The system of claim 12, wherein the operable conditions of the first vehicle include at least one of the following: a type of vehicle, drive train of the first vehicle, and an authorized route permits the first vehicle having the operable condition to traverse the route.

* * * * *